United States Patent [19]
Angelo et al.

[11] Patent Number: 6,116,509
[45] Date of Patent: Sep. 12, 2000

[54] COMPACT MOUNTING OF CHIP CARD READER AT FRONT OF COMPUTER DEVICE BAY AREA

[75] Inventors: Michael F. Angelo; Andrew Brown, both of Houston, Tex.

[73] Assignee: Compaq Computer Corporation, Houston, Tex.

[21] Appl. No.: 09/115,068

[22] Filed: Jul. 14, 1998

[51] Int. Cl.[7] .......................... G06F 17/00; G06K 13/00
[52] U.S. Cl. ...................... 235/492; 235/475; 235/479; 235/487; 361/685; 361/737
[58] Field of Search .................... 235/492, 479, 235/475, 487; 361/737, 685

[56] References Cited

U.S. PATENT DOCUMENTS

| | | | |
|---|---|---|---|
| 5,159,528 | 10/1992 | Murphy | 361/380 |
| 5,159,533 | 10/1992 | Kuang | 361/391 |
| 5,175,670 | 12/1992 | Wang | 361/390 |
| 5,224,019 | 6/1993 | Wong et al. | 361/393 |
| 5,227,954 | 7/1993 | Twigg | 361/391 |
| 5,271,152 | 12/1993 | Murphy | 29/830 |
| 5,363,273 | 11/1994 | Ma | 361/686 |
| 5,822,184 | 10/1998 | Rabinovitz | 361/685 |
| 5,902,991 | 5/1999 | Kumar | 235/492 |
| 5,933,328 | 8/1999 | Wallace et al. | 361/737 |
| 5,955,722 | 9/1999 | Kurz et al. | 235/479 |
| 5,967,633 | 10/1999 | Jung | 312/223.2 |

*Primary Examiner*—Michael G Lee
*Assistant Examiner*—Douglas X. Rodriguez

[57] ABSTRACT

The read head portion of a chip card reader is compactly mounted on the rear side of a front device bay faceplate in a computer in a manner permitting a peripheral device, representatively a hard disk drive, to be mounted in the device bay immediately behind the read head. To permit this installation of both the card read head and the peripheral device at the same computer drive bay, the read head is installed on the rear side of the faceplate at an acute angle relative thereto, with the card entry opening in the read head being aligned with a card insertion slot formed in the faceplate and being inclined at the read head installation angle. The electronics associated with the read head are also compactly mounted on the rear side of the faceplate. The angling of the read head relative to the device bay faceplate substantially reduces the rearward projection thereof toward the associated drive bay to an extent permitting the read head to be disposed entirely forwardly of the disk drive within the drive bay.

35 Claims, 2 Drawing Sheets

COMPACT MOUNTING OF CHIP CARD READER AT FRONT OF COMPUTER DEVICE BAY AREA

BACKGROUND OF THE INVENTION

1. Field of the Invention

The present invention generally relates to computer apparatus and, in a preferred embodiment thereof, more particularly relates to the mounting of a chip card reader in a device bay area of a computer.

2. Description of Related Art

A chip card is an electronic device having a relatively flexible, credit card-sized body in which an electronic chip is embedded, the chip typically being either a microprocessor or a pure memory chip with simplified latching. As commonly referred to in the computer industry, a chip card conforms to ISO standard 7816-1 through 9, and is typically used for purposes such as, for exemple, identity access control, electronic banking, security access control and access to a computer itself. Chip cards are typically readable/writeable devices and are used in conjunction with PIN numbers (personal identification numbers).

To access the information contained in the chip portion of the card, a device referred to as a "chip card reader" is employed. A chip card reader basically comprises a flat rectangular read head device having a cross-sectional size somewhat larger than that of the chip card, and a slot into which a chip-containing end portion of the card may be inserted. The head portion functions to operatively couple the chip to external electronics to carry out the read/write functions of the chip card.

The conventional method of incorporating chip card read/write capabilities into a computer has been to mount the read head on the rear side of a device bay faceplate in a manner such that the generally plate-shaped read head extends transversely from the faceplate rearwardly into its associated device bay, with the read head slot opening being aligned with a corresponding card insertion slot formed in the face plate. The primary problem with this conventional technique of mounting a chip card reader on a computer is that the presence of the mounted chip card reader at the front end of the drive bay precludes the mounting of a peripheral device, such as a hard disk drive, in the drive bay. In other words, the entire device bay must be dedicated to the installed chip card reader which encroaches into the bay in a manner preventing the installation of another peripheral device therein.

From the foregoing it can readily be seen that a need exists for an improved installation technique for mounting a chip card reader at the front end of a computer device bay in a manner which does not preclude the installation of another peripheral device in the bay. It is to this need that the present invention is directed.

SUMMARY OF THE INVENTION

In carrying out principles of the present invention, in accordance with a preferred embodiment thereof, a computer system is provided which includes a CPU unit having a microprocessor and a data storage device operative to store data retrievable by the microprocessor. The CPU unit further includes a housing having an exterior wall portion extending transversely to a first direction, and a device bay formed within the housing and extending inwardly in such first direction from adjacent the exterior wall portion into the interior of the housing.

The exterior wall portion is preferably a removable face plate which covers a device bay opening in the CPU housing. According to a key aspect of the invention, reading apparatus is incorporated in the CPU unit, between the device bay faceplate and the device bay, and is operative to read a readable electronic card device, representatively a chip card. Due to a unique positioning of the reading apparatus within the CPU unit at the device bay, the presence of the reading apparatus does not preclude the installation of a computer peripheral device, such as a hard disk drive, in the device bay. The reading apparatus positioned between the device bay and the removable face place does not encroach upon the bay space required by he installed peripheral device.

To accomplish this installation of both the card reading apparatus and a peripheral device such as a hard disk drive at the same internal device area in the CPU unit, a read head body portion of the reading apparatus is positioned between the faceplate and the drive bay, preferably being mounted on the rear or inner side of the faceplate, and extends at an angle relative to the first direction and at an acute angle relative to the faceplate. In this manner, the faceplate-to-peripheral device distance taken up by the read head body is substantially reduced to permit the read head body to be interposed in the relatively small space between the faceplate and the peripheral device within the bay area directly behind the removable faceplate. The read head body has an internal card-receiving slot opening outwardly therethrough toward the inner side of the removable faceplate.

The reading apparatus also includes an opening formed in the faceplate for permitting a portion of a readable electronic card device, representatively a chip card, to be inserted inwardly through the faceplate into a card-receiving slot disposed within the angled read head body. Illustratively, the read head body has a generally plate-shaped configuration, with its card-receiving slot opening outwardly through an edge portion thereof that faces the faceplate opening, and the face plate opening is an elongated card insertion slot which is aligned with the card-receiving slot of the read head body and laterally sloped at the same inclination angle as the read head body.

According to another feature of the invention, the card reading apparatus further includes an electronic portion which is external to the read head body, operatively coupled thereto, and compactly mounted therewith on the inner side of the removable device bay faceplate. Preferably, this electronic portion of the reader apparatus is cable-connectable to an appropriate portion of the CPU unit electronics.

In addition to providing a unique degree of installation compactness which provides the ability to place the card reader apparatus and a peripheral device such as a disk drive at the same bay area, the present invention also permits the faceplate-mounted card reader apparatus to be quickly and easily added to an existing computer at a drive bay already having a peripheral device, such as a hard disk drive, installed therein. To retrofit the computer with a card reader, all that is necessary is to simply remove the existing device bay faceplate, replace it with the faceplate/card reader assembly of the present invention, and make a quick CPU cable connection to the card reader electronics conveniently mounted on the faceplate.

DETAILED DESCRIPTION

Figure 1:
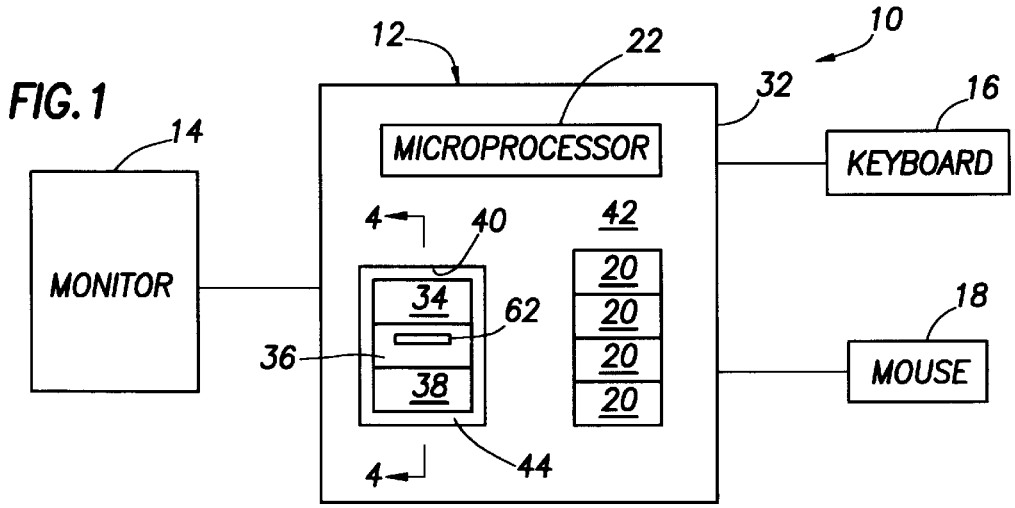
FIG. 1 is a schematic diagram of a computer system incorporating therein a specially designed low profile chip card reader installation embodying principles of the present invention.

Schematically illustrated in FIG. 1 is a representative computer system 10, the components of which are interconnected as shown and include a computer, illustratively in the form of a tower type CPU unit 12; a monitor 14; a keyboard 16; and a pointing device, representatively in the form of a mouse 18. In addition to various other components disposed therein, the CPU unit 12 has a data storage section, representatively a vertically stacked series of hard disk drives 20, operative to store data that may be retrieved by a microprocessor 22 within the CPU unit 12.

Figure 4:
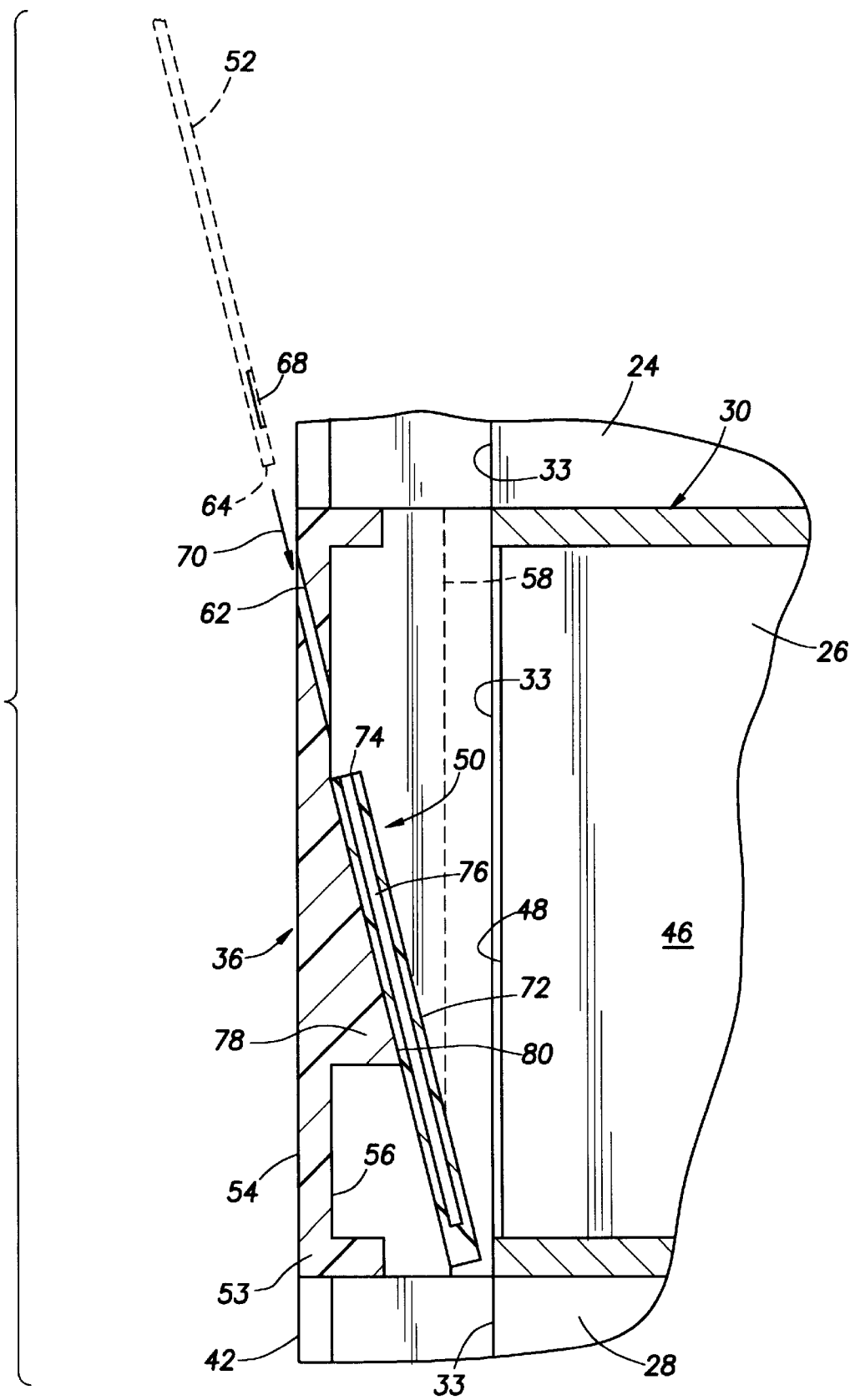
FIG. 4 is an enlarged scale simplified partial cross-sectional view taken through the computer along line 4—4 of FIG. 1 and showing the face plate/card reader assembly installed on the front side of the computer forwardly of a device bay in which a hard disk drive is operatively mounted.

Also incorporated in the CPU unit 12 are three vertically stacked device bays 24,26,28, portions of which are schematically shown in cross-section in FIG. 4. These three drive bays are formed in a sheet metal chassis structure 30 disposed within the outer housing 32 of the CPU unit 12 and have open front ends 33 spaced rearwardly apart from corresponding removable front faceplate members 34,36,38 received in a rectangular opening 40 formed in the vertical front wall 42 of the outer CPU unit housing 32. When installed, each of these faceplate members forms an external wall portion of the computer housing 32. A removable rectangular bezel 44 snaps into the opening 40 around the peripheries of the faceplate members 34,36,38 to conceal screws (not illustrated) that secure them to the chassis 30 as later described herein. As illustrated in simplified cross-sectional form in FIG. 4, a peripheral device, representatively a hard disk drive 46, is operatively mounted in the middle device bay 26 and has a front end 48 closely adjacent the open front end 33 of the device bay 26.

According to a key aspect of the present invention, chip card reader apparatus 50 is positioned adjacent the front end 33 of the bay 26 (see FIG. 4) and is useable in conjunction with a conventional chip card 52, a portion of which is shown in phantom in FIG. 4. Because of a unique mounting arrangement of the chip card reader apparatus 50 on the faceplate 36, as will now be described, its operative positioning at the location of the bay 26 does not preclude the operative mounting of the disk drive 46 therein—i.e., the same bay area 26 accommodates both the disk drive 46 and the chip card reader apparatus 50.

Figure 2:
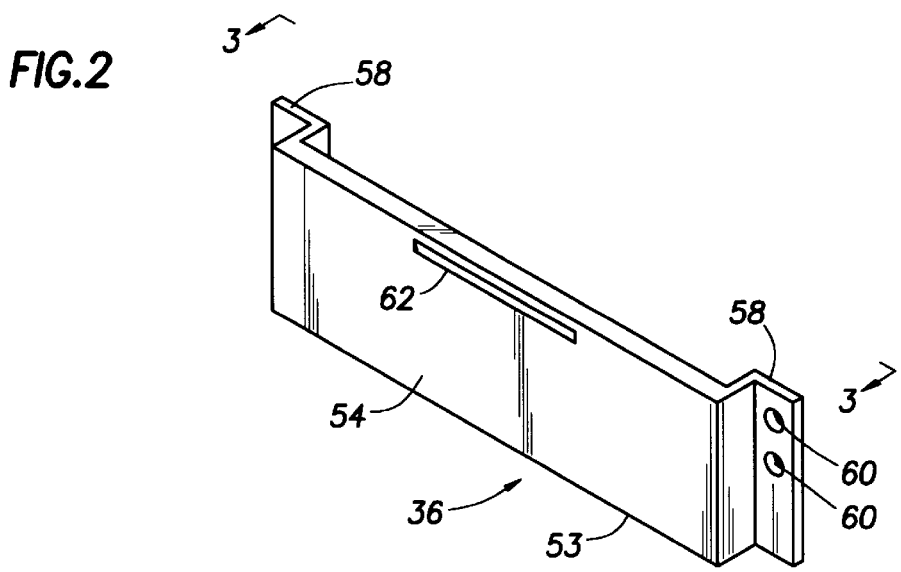
FIG. 2 is a perspective view of a slotted front drive bay face plate member removed from the computer and having the chip card reader and associated electronic circuitry mounted on its back side.
Figure 3:
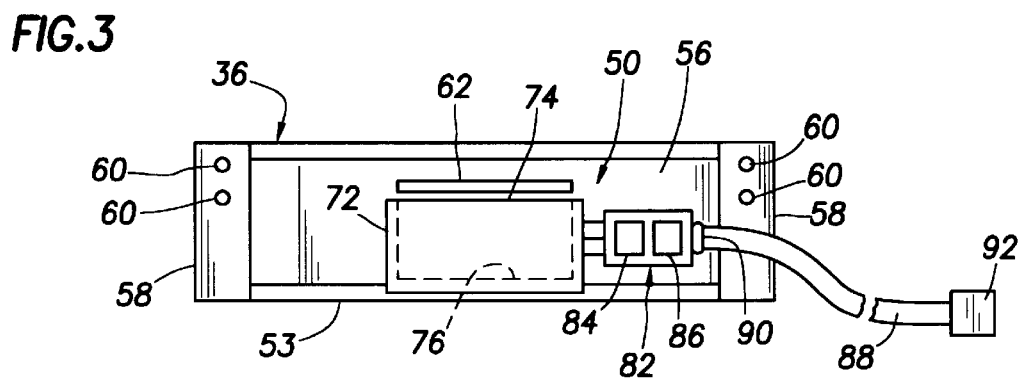
FIG. 3 is a simplified rear side elevational view of the face plate member taken along line 3—3 of FIG. 2.

Referring now to FIGS. 2–4, the front faceplate 36 is representatively a plastic molding and has a horizontally elongated rectangular body 52 with a front or outer side 54, a rear or inner side 56, and rearwardly offset opposite end mounting tab portions 58 with screw holes 60 extending therethrough. To attach the faceplate 36 to the sheet metal chassis 30 at the front end 33 of the bay 26, mounting screws (not shown) are extended rearwardly through the tab holes 60 and threaded into portions of the chassis 30.

A horizontally elongated chip card insertion slot 62 defines a portion of the chip card reader apparatus 50 and is formed through a central top side portion of the faceplate body 52, between its front and rear sides 54 and 56, and is laterally sloped forwardly and upwardly relative to the body 52 at a relatively small acute angle, representatively on the order of about fifteen degrees. The end 64 of the chip card 52 has a chip 68 embedded therein and may, as indicated by the arrow 70 in FIG. 4, be inserted inwardly through the laterally sloped faceplate insertion slot 62.

The chip card reader apparatus 50 further includes a generally conventional read head body 72 having a thin rectangular plate configuration with an upper side edge 74 through which an internal card receiving slot 76 outwardly opens. The read head body 72 is secured to the rear side 56 of the faceplate body 52 and is inclined relative thereto at the same angle as the faceplate slot 62. The upper side edge 74 of the read head body 72 is positioned somewhat below the faceplate slot 62, with the read head slot 76 being aligned with the faceplate slot 62 in a manner such that when the chip card end 64 is inwardly inserted through the faceplate slot 62 it operatively enters the read head slot 76.

The read head body 72 is representatively secured to the rear side 56 of the faceplate body 52 at the indicated angle relative thereto by means of a thickened central portion 78 of the body 52 having a rearwardly and downwardly sloped rear side surface 80. The inclined front side surface of the read head body 72 is appropriately secured to the surface 80 by suitable means such as fastening members or adhesive.

As illustrated in FIG. 3, the chip card reader apparatus 50 also includes a conventional external electronics portion 82 that is representatively mounted on the rear side 56 of the faceplate body 52 to one side of the read head body 72 and is electrically coupled to the read head body 72 in a conventional manner. Alternatively, the electronics portion 82 could be mounted on the rear side 56 in an underlying relationship with the head body 72, or in a suitable location remote from the faceplate 36.

Illustratively, the electronics portion 82 includes a clock 84 and a digital-to-analog converter 86. An electrical cable member 88 is removably coupled at one end, as at 90, to the chip card reader electronics portion 82, and is connected at its other end to appropriate CPU electronics 92 such as an I/O port, a COM port or a parallel port. When the chip card end 64 is inserted inwardly through the faceplate slot 62 and into the read head slot 76, the card reader electronics 82, via the cable 88 and the CPU electronics 92, function in a conventional manner to provide the microprocessor 22 with data from the card chip 68.

As previously stated, the unique inclined mounting of the read head 72 at the front end of the bay 26 permits both the card reader apparatus 50 and the peripheral device 46 (representatively a hard disk drive) to be accommodated by the bay 26—i.e., the installation of the chip card reader apparatus 50 at the bay 26 does not preclude the installation of the hard drive 46 in the bay 26 as would occur if the card read head 72 was conventionally mounted transversely to the faceplate 36 and extended rearwardly into the bay 26.

While the specially oriented card reader apparatus 50 has been representatively illustrated and described as being utilized in conjunction with a chip card 66, it will be readily appreciated by those of skill in this particular art that principles of the present invention could also be used to advantage in conjunction with a variety of other types of readable electronic card devices such as, by way of example, "smart cards", optical cards, magnetic stripe cards.

A variety of other modifications could be made to the representatively illustrated read head/peripheral device structure without departing from the spirit and scope of the present invention. For example, peripheral devices other than the illustrated hard disk drive 46 could be installed in the bay 26 behind the faceplate-mounted chip card reader apparatus 50. Additionally, the faceplate slot 62 could be vertically elongated and laterally slanted toward one of the faceplate ends 58, with the read head body 72 being correspondingly reoriented behind the face plate 36. Also, while the card reader apparatus 50 has been illustratively depicted as being a peripheral device like the disk drive 46, it could alternatively be an integral portion of the CPU unit 12.

In addition to providing a unique degree of installation compactness which provides the ability to place the card reader apparatus 50 and a peripheral device such as the disk drive 46 at the same bay area, the present invention also permits the faceplate-mounted card reader apparatus 50 to be quickly and easily added to an existing computer at a drive bay already having a peripheral device, such as a hard disk drive, installed therein. To retrofit the computer with a card reader, all that is necessary is to simply remove the existing device bay faceplate, replace it with the faceplate/card reader assembly 36,50, and make a quick CPU cable connection to the card reader electronics 82 conveniently mounted on the faceplate 36 as described above.

The foregoing detailed description is to be clearly understood as being given by way of illustration and example only, the spirit and scope of the present invention being limited solely by the appended claims.

What is claimed is:

1. Electronic card device reader apparatus comprising:
   a wall member securable over a device bay opening in a computer housing wall, said wall member having inner and outer sides;
   an electronic card read head body carried on said inner side of said wall member at an acute angle relative thereto and having a card-receiving slot opening facing said inner side; and
   an opening formed in said wall member for permitting a portion of a readable electronic card device to be inserted from said outer side of said wall member into said card-receiving slot opening.

2. The electronic card device read apparatus of claim 1 wherein said opening formed in said wall member is a card insertion slot laterally sloped at said acute angle relative to said wall member.

3. The electronic card device read apparatus of claim 2 wherein:
   said read head body has a generally plate-shaped configuration with an edge portion facing said card insertion slot in said wall member, and
   said card-receiving slot opening is disposed in said edge portion of said read head body.

4. The electronic card device reader apparatus of claim 1 wherein said apparatus is useable to read a chip card.

5. The electronic card device reader apparatus of claim 1 wherein said wall member is a removable faceplate member.

6. The electronic card device reader apparatus of claim 1 further comprising an electronic portion carried on said inner side of said wall member and operatively connected to said read head body.

7. The electronic card device reader apparatus of claim 6 wherein said electronic portion is cable-connectable to a portion of the electronic circuitry within a computer.

8. Computer apparatus comprising:
   a housing having an exterior wall portion extending transversely to a first direction;
   a device bay formed within said housing and extending inwardly in said first direction from adjacent said exterior wall portion into the interior of said housing; and
   reading apparatus operative to read a readable electronic card device, including:
      a read head body positioned generally between said exterior wall portion and said device bay and extending toward said device bay at an angle relative to said first direction, said read head body having an internal card-receiving slot opening outwardly therethrough toward said exterior wall portion, and
      an opening formed in said exterior wall portion for permitting a portion of a readable electronic card device to be inserted into said card-receiving slot in said read head body.

9. The computer apparatus of claim 8 wherein said device bay has a computer peripheral device operatively installed therein.

10. The computer apparatus of claim 9 wherein said computer peripheral device is a hard disk drive.

11. The computer apparatus of claim 8 wherein said reading apparatus is operative to read a chip card.

12. The computer apparatus of claim 8 wherein said exterior wall portion is a removable face plate member.

13. The computer apparatus of claim 8 wherein said opening formed in said exterior wall portion is a card insertion slot laterally sloped at said acute angle relative to said exterior wall portion.

14. The computer apparatus of claim 13 wherein:
   said read head body has a generally plate-shaped configuration with an edge portion facing said card insertion slot in said exterior wall portion,
   said card-receiving slot opening is disposed in said edge portion of said read head body, and
   said read head body is supported on an inner side portion of said exterior wall portion.

15. The computer apparatus of claim 8 wherein:
   said computer apparatus further comprises CPU circuitry disposed within said housing,
   said read head body is supported on an inner side portion of said exterior wall portion, and
   said reading apparatus further includes an electronic portion positioned on said inner side portion of said exterior wall portion and electrically coupled between said read head body and said CPU circuitry.

16. Computer apparatus comprising:
   a housing having an exterior wall portion extending transversely to a first direction, said exterior wall portion having a device bay opening therein;
   a device bay formed within said housing and extending inwardly in said first direction into the interior of said housing from adjacent said device bay opening;
   a removable faceplate member extending across said device bay opening and having inner and outer sides; and
   reading apparatus operative to read a readable electronic card device, including:
      a read head body secured to said inner side of said faceplate member and disposed between said faceplate member and said device bay, said read head body extending toward said device bay at an angle relative to said first direction and having an internal card-receiving slot opening outwardly therethrough toward said faceplate member,
      an electronics portion operatively associated with and external to said read head body, and
      an opening formed in said faceplate member for permitting a portion of a readable electronic card device to be inserted into said card-receiving slot in said read head body.

17. The computer apparatus of claim 16 wherein said reading apparatus is operative to read a chip card.

18. The computer apparatus of claim 16 wherein said electronics portion is carried on said inner side of said faceplate member.

19. The computer apparatus of claim 16 further comprising a computer peripheral device operatively installed in said device bay.

20. The computer apparatus of claim 19 wherein said computer peripheral device is a hard disk drive.

21. The computer apparatus of claim 16 wherein:
said opening formed in said faceplate member is a card insertion slot laterally sloped at said angle relative to said first direction,
said read head body has a generally plate-shaped configuration with an edge portion facing said card insertion slot in said faceplate member, and
said internal card receiving slot opens outwardly through said edge portion.

22. A computer system comprising a CPU unit having a microprocessor and a data storage device operative to store data retrievable by said microprocessor, said CPU unit further comprising:
a housing having an exterior wall portion extending transversely to a first direction;
a device bay formed within said housing and extending inwardly in said first direction from adjacent said exterior wall portion into the interior of said housing; and
reading apparatus operative to read a readable electronic card device, including:
a read head body positioned generally between said exterior wall portion and said device bay and extending toward said device bay at an angle relative to said first direction, said read head body having an internal card-receiving slot opening outwardly therethrough toward said exterior wall portion, and
an opening formed in said exterior wall portion for permitting a portion of a readable electronic card device to be inserted into said card-receiving slot in said read head body.

23. The computer system of claim 22 wherein said device bay has a computer peripheral device operatively installed therein.

24. The computer system of claim 23 wherein said computer peripheral device is a hard disk drive.

25. The computer system of claim 22 wherein said reading apparatus is operative to read a chip card.

26. The computer system of claim 22 wherein said exterior wall portion is a removable face plate member.

27. The computer system of claim 22 wherein said opening formed in said exterior wall portion is a card insertion slot laterally sloped at said acute angle relative to said exterior wall portion.

28. The computer system of claim 27 wherein:
said read head body has a generally plate-shaped configuration with an edge portion facing said card insertion Slot in said exterior wall portion,
said card-receiving slot opening is disposed in said edge portion of said read head body, and
said read head body is supported on an inner side portion of said exterior wall portion.

29. The computer of claim 22 wherein:
said computer apparatus further comprises CPU circuitry disposed within said housing,
said read head body is supported on an inner side portion of said exterior wall portion, and
said reading apparatus further includes an electronic portion positioned on said inner side portion of said exterior wall portion and electrically coupled between said read head body and said CPU circuitry.

30. A computer system comprising a CPU unit having a microprocessor and a data storage device operative to store data retrievable by said microprocessor, said CPU unit further comprising:
a housing having an exterior wall portion extending transversely to a first direction, said exterior wall portion having a device bay opening therein;
a device bay formed within said housing and extending inwardly in said first direction into the interior of said housing from adjacent said device bay opening;
a removable faceplate member extending across said device bay opening and having inner and outer sides; and
reading apparatus operative to read a readable electronic card device, including:
a read head body secured to said inner side of said faceplate member and disposed between said faceplate member and said device bay, said read head body extending toward said device bay at an angle relative to said first direction and having an internal card-receiving slot opening outwardly therethrough toward said faceplate member,
an electronics portion operatively associated with and external to said read head body, and
an opening formed in said faceplate member for permitting a portion of a readable electronic card device to be inserted into said card-receiving slot in said read head body.

31. The computer system of claim 30 wherein said reading apparatus is operative to read a chip card.

32. The computer system of claim 30 wherein said electronics portion is carried on said inner side of said faceplate member.

33. The computer system of claim 30 further comprising a computer peripheral device operatively installed in said device bay.

34. The computer system of claim 33 wherein said computer peripheral device is a hard disk drive.

35. The computer system of claim 30 wherein:
said opening formed in said faceplate member is a card insertion slot laterally sloped at said angle relative to said first direction,
said read head body has a generally plate-shaped configuration with an edge portion facing said card insertion slot in said faceplate member, and
said internal card receiving slot opens outwardly through said edge portion.

* * * * *